United States Patent [19]

Toyoda et al.

[11] 3,925,441
[45] Dec. 9, 1975

[54] ISOTHERMAL SULFONATION PROCESS

[75] Inventors: Sadao Toyoda; Toshiaki Ogoshi, both of Funabashi; Minoru Maruyama, Soka; Yozo Miyawaki, Narashino, all of Japan

[73] Assignee: Lion Fat & Oil Co., Ltd., Tokyo, Japan

[22] Filed: Oct. 24, 1973

[21] Appl. No.: 409,088

[52] U.S. Cl. ............... 260/458; 260/457; 260/459; 260/505 S; 260/512 R; 260/513 T
[51] Int. Cl.² ............... C07C 141/02; C07C 143/16
[58] Field of Search ............ 260/513 T, 505 S, 458, 260/457, 460, 459, 456 R, 456 P

[56] References Cited
UNITED STATES PATENTS
2,923,728  2/1960  Falk et al. ..................... 260/513 R
FOREIGN PATENTS OR APPLICATIONS
2,138,038  3/1972  Germany ....................... 260/513 R Primary Examiner—James O. Thomas, Jr.
Assistant Examiner—Nicky Chan
Attorney, Agent, or Firm—Woodhams, Blanchard and Flynn

[57] ABSTRACT

In the process for sulfonation by contacting a falling thin film stream of organic compound with a stream of $SO_3$-inert gas in parallel, an improved process for isothermal sulfonation producing sulfonates of high quality, which comprises making a $SO_3$-containing cooling gas (wherein the $SO_3$ content is 1 to 20 wt.% relative to the whole amount of $SO_3$ to be employed) in the amount of about 2 to 12 times (by volume) as much as the total amount of said stream of $SO_3$-inert gas flow in parallel between said falling thin film stream of organic compound and said stream of $SO_3$-inert gas.

2 Claims, No Drawings

ISOTHERMAL SULFONATION PROCESS

BACKGROUND OF THE INVENTION a. Field of the Invention

The present invention relates to an improvement of the process for sulfonation by contacting a falling thin film stream of organic compound with a stream of $SO_3$-inert gas in parallel. The term 'sulfonation' herein means the so-called sulfonation and sulfation.

b. Description of the Prior Art

The known processes of sulfonation vary depending on the properties and structures of hydrocarbon, etc. to be subjected to sulfonation as well as the kinds of articles to be manufactured therefrom, and sulfonation by the use of sulfur trioxide is one of the typical means. This sulfur trioxide can theoretically complete the addition reaction rapidly and quantitatively, so that it is a very effective sulfonating agent and has been generally utilized for this purpose. But, sulfur trioxide, when employed as it is, will generate extreme heat resulting in various side reactions, and, therefore, diluting it with air or an inert gas prior to application thereof has been widely practiced.

Even in the case of application of $SO_3$ gas diluted with an inert gas, however, the velocity of sulfonation is so high that the greater part of sulfonation is accomplished at the early stage of reaction, and as this reaction is a strong exothermic reaction, there occurs a peak of temperature at the early stage of reaction, causing side reactions, discoloring of the product, lowering of the conversion rate and generation of the mist within the waste gas.

To cope with the foregoing disadvantages and particularly to prevent the occurrence of the peak of temperature as described above, the inventors have previously proposed in German patent publication OLS-2,138,038 a process comprising introducing an inert cooling gas such as air in the amount of 2 to 12 times by volume as much as the total amount of $SO_3$-inert gas between a thin film stream of the organic material and a stream of $SO_3$-inert gas in parallel therewith. According to this prior process, though progress of the sulfonation reaction can be controlled to a considerable extent by virtue of the diffusion and permeation or diffusion development of $SO_3$ gas into the reaction mixture entering the velocity controlling step, the reaction at the early stage is so slow that it takes time, even though a relatively small amount, for the material introduced into the reaction zone to attain the desired temperature, and it has been impossible to obtain satisfactory effects also in respect of the color of the product, the conversion rate and the generation of by-products. Especially in the case of employing an α-olefin as the organic starting material, there has been observed a tendency for 2-hydroxy alkane sulfonate to occur, which is an undesirable by-product in respect to detergents. Further, in the case of a organic material having a relatively high melting point, it has been accompanied by such difficulty that a portion of the organic material would become solidified and addhere to the inside wall surface of the sulfonator.

SUMMARY OF THE INVENTION

One object of the present invention is to eliminate the foregoing defects in the prior art and to provide a process which provides a sulfonated product free from discoloring and from by-products, at a high conversion rate, by making it possible to raise the reaction temperature to a desired temperature immediately after the start of the reaction without said peak of temperature.

Another object of the present invention is to provide an isothermal sulfonation process capable of reducing the generation of mist within the waste gas.

A further object of the present invention is to provide an isothermal sulfonation process capable of preventing adhesion of the product to the inside of the sulfonator even in the case of employing a organic material having a relatively high melting point.

The word 'immediately' herein signifies the time necessary for the reactant flowing to the extent of less than about 7% of the full length of the reaction zone from the point of contact (the period of this time is practically immeasurable, but is presumed to be 5% or thereabouts relative to the total reaction time).

The present invention relates to an isothermal sulfonation process as an improvement in the process for sulfonation by flowing downwardly a thin film stream of organic compound together with a stream of $SO_3$-inert gas, causing said streams to run in parallel, characterized in that a $SO_3$-containing cooling gas (wherein the $SO_3$ content is 1 to 20 wt.% relative to the whole amount of $SO_3$ used) in the amount of about 2 to 12 times (by volume) as much as the total volume of said stream of $SO_3$-inert gas, is introduced in parallel between said thin film stream of organic compound and said stream of $SO_3$-inert gas.

The present method is applicable to any type of film-sulfonation apparatus such as double-cylinder type, flat plate type, etc. as well as one combining a plurality thereof.

As the starting organic compound to be sulfonated, various olefins (namely, α-olefin, inner olefin and vinylidene-type olefin) having 8 to 30 carbon atoms, alkyl benzene having 8 to 15 carbon atoms, aliphatic alcohol having 8 to 24 carbon atoms, alkyline oxide derivatives of aliphatic alcohol having 8 to 22 carbon atoms, alkylene oxide derivatives of alkyl phenol having 8 to 15 carbon atoms, etc. are applicable. These organic compounds are employed in the form of a falling thin film stream, and the temperature thereof at the time of being introduced into the reaction zone is usually in the range of 10° to 45°C, though it varies with the kind of organic material.

As for the cooling gas employed for the $SO_3$-containing cooling gas, it can be either identical with or different from the gas used in said $SO_3$-inert gas stream as long as it is an inert gas, and the applicable gases includes, for instance, air, nitrogen and carbon dioxide gas. The content of $SO_3$ in this $SO_3$-containing cooling gas is in the range of 1 to 20 wt.%-preferably 3 to 15 wt.%-relative to the whole amount of $SO_3$ employed. However, when said $SO_3$ content is less than 1 wt.%, the thin film stream of the reacting material immediately after the start of reaction fails to attain the desired temperature while when said $SO_3$ content is more than 20 wt.%, occurrence of the peak of the rise in temperature as mentioned above is un-avoidable, caused by over sulfonation; so that both cases are undesirable.

On the other hand, the concentration of $SO_3$ gas per se in the $SO_3$-containing cooling gas is in the range of about 0.01 to 2% by volume-preferably in the range of about 0.02 to 1% by volume, but is not particularly limited. This $SO_3$-containing cooling gas is introduced into the reaction zone to the extent of about 2 to 12 times by volume-preferably about 2 to 7 times by volume-as much as the total amount of the $SO_3$-inert gas employed, at a temperature of about 10° to 40°C and at a velocity substantially the same to about 1/1.4 times as much as that of the stream of $SO_3$-inert gas. In the case of the amount of $SO_3$-containing cooling gas is less than about 2 times as much as the total amount of said $SO_3$-inert gas, occurrence of the peak of rise in temperatures as mentioned above is un-avoidable, so that the initially intended isothermal sulfonation reaction fails to occur, while if the amount of said cooling gas is more than about 12 times as much as the total amount of said $SO_3$-inert gas, the contact of the organic material and $SO_3$ at a desired position is insufficient, so that such disadvantages as retardation of reaction, etc. are caused.

As for the $SO_3$-containing inert gas for use in the present invention, any of the conventional ones is applicable. To be precise, the concentration of $SO_3$ therein is in the range of about 3 to 15% by volume, the velocity for introducing it into the reaction zone is in the range of about 20 to 100 m/sec — preferably about 30 to 80 m/sec, and the temperature thereof at the time of being introduced into the reaction zone is in the range of 20° to 50°C.

According to the process of the present invention, the sulfonation reaction is so advantageously effected that occurrence of undesirable side reactions, generation of coloring matters therein can be controlled, resulting in a product of high quality. Besides, as the chance of the product getting colored is minimized, the bleaching process in the after-treatment can be dispensed with. Further, as the present invention renders the reaction surface of the film of the reactant regulable, generation of mist is markedly decreased, and the reaction can be efficiently effected, thereby achieving not only an increase in yield but also economy of the sulfonating agent. Moreover, the effect of reducing the mist within the waste gas is highly contributive to the prevention of air pollution. Therefore, the industrial merits of the present invention are tremendous.

Hereunder are given some examples embodying the present invention.

DESCRIPTION OF THE PREFERRED EMBODIMENTS

EXAMPLE 1.

α-olefin ($C_{15-18}$) obtained through wax cracking was employed as the organic material and it was made into a film stream by use of a falling thin film type sulfonator (length of reaction zone: 2 m) cooled with a cooling water at 20°C and contacted with a stream of $SO_3$-air and a stream of $SO_3$-containing cooling air flowing parallel thereto under the following conditions, to effect the reaction.

In this case, the velocity of the stream of $SO_3$-containing cooling air was set to be about the same as that of the stream of $SO_3$-air, and the desired reaction temperature (namely, the temperature of thin film at various places inside the apparatus as measured with a thermocouple having the outside diameter of 0.2 mm) was set at 50°C when the feed rate of organic material was 140 Kg/m.hr and at 60°C when said feed was 250 Kg/m.hr. The molar ratio of $SO_3$ (relative to the starting material) was set at 1.14.

temperature of air employed:
   cooling air and $SO_3$-containing cooling air    : 25°C -continued

| | |
|---|---|
| $SO_3$-containing air | : 40°C |

The amount of $SO_3$ for use in $SO_3$-containing cooling air was set to be 5 wt.% relative to the whole amount of $SO_3$ employed.

| | Conditions for present example | | | |
|---|---|---|---|---|
| | Concentration of $SO_3$ gas | (feed rate of organic material) | Feed rate of gas | Velocity of gas stream |
| $SO_3$-air stream | 7.3 vol.% 12.8 vol.% | (140 Kg/m.hr) (250 Kg/m.hr | 0.85 Nm³/min | 65 m/sec |
| $SO_3$-containing cooling gas stream | 0.17 vol.% 0.30 vol.% | (140 Kg/m.hr. (250 Kg/m.hr) | 2.15 Nm³/min | 65 m/sec |

Further, for the purpose of comparison, a similar reaction was effected by a stream of cooling air not containing $SO_3$ (hereinafter called 'cooling air stream' for short) instead of said stream of $SO_3$-containing cooling air.

| | Conditions for comparative example | | | |
|---|---|---|---|---|
| | Concentration of $SO_3$ gas | (feed rate of organic material) | Feed rate of gas | Velocity of gas stream |
| $SO_3$-air stream | 8.1 vol.% vol.% 13.4 vol.% | (140 Kg/m.hr) Kg/m.hr) (250 Kg/m.hr) | 0.85 Nm³/min | 65 m/sec |
| cooling air stream | — | | 2.15 Nm³/min | 65 m/sec |

The measured temperature of the thin film stream of the reactant was as shown in Table 1.

Table 1

| | Distance between measurement spot and $SO_3$-feeding nozzle | Temperature of thin film stream | |
|---|---|---|---|
| | | feed rate of organic material being 140Kg/m.hr | feed rate or organic material being 250Kg/m.hr |
| | (cm) | (°C) | (°C) |
| comparative example | 7 | 27 | 28 |
| | 13 | 35 | 41 |
| | 20 | 45 | 58 |
| | 35 | 53 | 64 |
| | 200 | 45 | 50 |
| | (cm) | (°C) | (°C) |
| present example | 7 | 39 | 50 |
| | 13 | 49 | 60 |
| | 20 | 50 | 63 |
| | 35 | 52 | 66 |
| | 200 | 45 | 50 |

The properties (after neutralization and hydrolysis) of the olefin sulfonate obtained in the sulfonation test in the case of feeding the material at the rate of 140°Kg/m.hr* were as shown in Table 2.

Table 2

|  | Comparative example | Present example |
|---|---|---|
| unreacted oil content (petroleum ether extract) (active basis) (wt.%) | 3.50 | 3.48 |
| Coloring (5% concentration) (Absorbance (or light of absorption): 10 mm cell, 420 mμ) | 0.530** | 0.48 |
| Content of disulfonate (active basis) (wt.%) | 8.2 | 8.2 |
| Condition when dissolved in water (25°C) | somewhat turbid with whiteness | clear |

*In the following Examples 2–6, the feed of organic material was also set at 140 Kg/m.hr.

**Measurement was conducted after filtering with a 0.45μ-milliporefilter.

EXAMPLE 2.

Sulfonation was effected by applying the same procedures as in Example 1 (including the comparative example; the same applies hereinafter down to Example 6) except for the following modification of the conditions. The result was shown in Table 3.

material: α-olefin having 16 carbon atoms as obtained through Ziegler's method (or process)
stream of $SO_3$-air: concentration $SO_3$ gas = 7.6 vol.%
stream of $SO_3$-containing cooling air:
   amount of $SO_3$ employed (relative to the whole amount employed): 7 wt.%
   concentration of $SO_3$ gas: 0.25 vol.%

Table 3

|  | Comparative example | Present example |
|---|---|---|
| temperature of film stream at a point 13 cm away from $SO_3$-feeding nozzle (°C) | 36 | 50 |
| unreacted oil content (petroleum ether extract) (active basis) (wt.%) | 2.60 | 2.52 |
| coloring (5% concentration) (Absorbance : 10 mm cell, 420 mμ) | 0.075 | 0.070 |
| content of disulfonate (active basis) (wt.%) | 7.1 | 6.8 |
| condition when dissolved in water (°C) | somewhat turbid with whiteness | clear |

EXAMPLE 3

Sulfonation was effected by applying the same procedures as in Example 1 except for the following modification of the conditions. The result was as shown in Table 4.

organic material: α-olefin having 14 carbon atoms, obtained through Ziegler's method
molar ratio of $SO_3$ (relative to material): 1.00
stream of $SO_3$-air: concentration of $SO_3$ gas = 7.4 vol.%
stream of $SO_3$-containing cooling air:
   amount of $SO_3$ employed (relative to the whole amount employed): 5 wt.%
   concentration of $SO_3$ gas: 0.18 vol.%

Table 4

|  | Comparative example | Present example |
|---|---|---|
| temperature of film stream at a point 13 cm away from $SO_3$-feeding nozzle (°C) | 38 | 50 |
| unreacted oil content (petroleum ether extract) (active basis) (wt.%) | 6.20 | 5.75 |
| coloring (5% concentration) (absorbance : 10 mm cell, 420 mμ) | 0.030 | 0.020 |
| content of disulfonate (active basis) (wt.%) | 2.0 | 2.0 |
| condition when dissolved in water (25°C) | turbid with whiteness | clear |

EXAMPLE 4

Sulfation was effected by applying the same procedures as in Example 1 except for the following modification of the conditions. The result was as shown in Table 5.

organic material: condensation product of $C_{12}$ alcohol with 3 mol of ethylene oxide (mean molecular weight: 330)
molar ratio of $SO_3$ (relative to organic material): 1.03
stream of $SO_3$-air: concentration of $SO_3$ gas = 4.5 vol.%
stream of $SO_3$-containing cooling air:
   amount of $SO_3$ employed (relative to the whole amount employed): 14 wt.%
   concentration of $SO_3$ gas: 0.30 vol.%
temperature of cooling water: 25°C
velocity of stream of $SO_3$-inert air: 45 m/sec
velocity of stream of $SO_3$-containing air: 55 m/sec

Table 5

|  | Comparative example | Present example |
|---|---|---|
| temperature of film stream at a point 13 cm away from $SO_3$-feeding nozzle (°C) | 30 | 45 |
| unreacted oil content (obtained through ion-exchange process) (active basis) (wt.%) | 2.30 | 2.15 |
| coloring (5% concentration) (absorbance : 10 mm cell, (420 mμ) | 0.014 | 0.012 |

EXAMPLE 5.

Sulfonation was effected by applying the same procedures as in Example 1 except for the following modification of the conditions. The result was as shown in Table 6.

organic material: alkyl benzene (mean molecular weight: 243)
molar ratio of $SO_3$ (relative to organic material): 1.05
stream of $SO_3$-air: concentration of $SO_3$ gas = 6.1 vol.%
stream of $SO_3$-containing cooling gas:
   amount of $SO_3$ employed (relative to the whole amount employed): 10 wt.%
   concentration of $SO_3$ gas: 0.30 vol.%
temperature of cooling water: 26°C
velocity of stream of $SO_3$-inert air: 45 m/sec velocity of stream of $SO_3$-containing air: 49 m/sec Table 6

|  | Present example |
|---|---|
| temperature of film stream at a point 13 cm away from $SO_3$-feeding nozzle (°C) | 46 |
| unreacted oil content (petroleum ether extract) (active basis) (wt.%) | 1.10 |
| coloring (5% concentration) (absorbance : 10 mm cell, 420 mµ) | 0.010 |
| content of alcohol insoluble matter (active basis) (wt.%) | 0.75 |

EXAMPLE 6.

Sulfation was effected by applying the same procedures as in Example 1 except for the following modification of the conditions. The result was as shown in Table 7.

organic material: synthetic alcohol having 12 carbon atoms (mean molecular weight: 205)

molar ratio of $SO_3$ (relative to organic material): 1.02 stream of $SO_3$-air: concentration of $SO_3$ gas = 7.2 vol.% stream of $SO_3$-containing cooling air:
  amount of $SO_3$ employed (relative to whole amount employed): 6 wt.%
  concentration of $SO_3$ gas: 0.21 vol.% temperature of cooling water: 25°C velocity of stream of $SO_3$-inert air: 45 m/sec velocity of stream of $SO_3$-containing air: 62 m/sec Table 7

|  | Present example |
|---|---|
| temperature of film stream at a point 13 cm away from $SO_3$-feeding nozzle (°C) | 48 |
| unreacted oil content (petroleum ether extract) (active basis) (wt.%) | 2.80 |
| coloring (5% concentration) (absorbance : 10 mm cell, 420 mµ) | 0.012 |

What is claimed is:

1. In a process for sulfonating α-olefins having 8 to 30 carbon atoms, comprising flowing a thin film of said α-olefin having a temperature of from 10° to 45°C along an externally cooled reaction surface in a reaction zone, and contacting said film with a separately supplied first stream of a mixture of gaseous sulfur trioxide and inert gas and with a separately supplied second stream of cooling gas that flows in parallel with said film and said first stream and is located therebetween, the volumetric flow rate of said second stream being from 2 to 12 times the volumetric flow rate of the first stream, whereby to effect sulfonation, the improvement which comprises: the second gaseous stream consists essentially of a mixture of gaseous sulfur tri-oxide and inert gas and said second stream is flowed into the feed end of said reaction zone in parallel with, in contact with and between said film and said first stream so as to form at the feed end of said reaction zone a parallel flowing layer of said second gaseous stream between said film and said first stream, said second stream having a temperature of from 10° to 40°C and having a velocity in the range of from 1 to 1.4 times the velocity of the first stream, said second stream containing from 0.01 to 2 volume percent of sulfur trioxide and the balance is inert gas, said first stream containing from 3 to 15 volume percent of $SO_3$ and the balance is inert gas, said first stream having a velocity of from 20 to 100 m/sec and a temperature of from 20° to 50°C, said second stream supplying from 1 to 20 weight percent of the total $SO_3$ supplied by both the first and second streams.

2. In a process for sulfating condensation products of ethylene oxide with an aliphatic alcohol having 8 to 22 carbon atoms, comprising flowing a thin film of said condensation product having a temperature of from 10° to 45°C along an externally cooled reaction surface in a reaction zone, and contacting said film with a separately supplied first stream of a mixture of gaseous sulfur trioxide and inert gas and with a separately supplied second stream of cooling gas that flows in parallel with said film and said first stream and is located therebetween, the volumetric flow rate of said second stream being from 2 to 12 times the volumetric flow rate of the first stream, whereby to effect sulfation, the improvement which comprises: the second gaseous stream consists essentially of a mixture of gaseous sulfur trioxide and inert gas and said second stream is flowed into the feed end of said reaction zone in parallel with, in contact with and between said film and said first stream so as to form at the feed end of said reaction zone a parallel flowing layer of said second gaseous stream between said film and said first stream, said second stream having a temperature of from 10° to 40°C and having a velocity in the range of from 1 to 1.4 times the velocity of the first stream, said second stream containing from 0.01 to 2 volume percent of sulfur trioxide and the balance is inert gas, said first stream containing from 3 to 15 volume percent of $SO_3$ and the balance is inert gas, said first stream having a velocity of from 20 to 100 m/sec and a temperature of from 20° to 50°C, said second stream supplying from 1 to 20 weight percent of the total $SO_3$ supplied by both the first and second streams.

* * * * *